(12) United States Patent
Zhu

(10) Patent No.: US 11,755,505 B2
(45) Date of Patent: Sep. 12, 2023

(54) METHOD AND SYSTEM FOR ACCESSING A NONVOLATILE MEMORY VIA SPI PORTS

(71) Applicant: GOWIN Semiconductor Corporation, GuangZhou (CN)

(72) Inventor: Jinghui Zhu, San Jose, CA (US)

(73) Assignee: GOWIN SEMICONDUCTOR CORPORATION, Guangzhou (CN)

( * ) Notice: Subject to any disclaimer, the term of this patent is extended or adjusted under 35 U.S.C. 154(b) by 7 days.

(21) Appl. No.: 17/674,630

(22) Filed: Feb. 17, 2022

(65) Prior Publication Data

US 2023/0259465 A1 Aug. 17, 2023

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01)

(58) Field of Classification Search
CPC ....................................................... G06F 15/17
See application file for complete search history.

(56) References Cited

U.S. PATENT DOCUMENTS

| | | | | |
|---|---|---|---|---|
| 9,699,653 | B2* | 7/2017 | MacDuff | H04W 76/30 |
| 2002/0173298 | A1* | 11/2002 | Elayda | G06F 15/7867 455/418 |
| 2015/0365092 | A1* | 12/2015 | Averbouch | H03K 19/17772 326/38 |
| 2021/0226633 | A1* | 7/2021 | Zhu | H03K 19/17728 |

* cited by examiner

*Primary Examiner* — Henry Tsai
*Assistant Examiner* — Juanito C Borromeo
(74) *Attorney, Agent, or Firm* — JW Law Group; James M. Wu

(57) ABSTRACT

A system contains a field-programmable gate array ("FPGA"), a controller, and a non-volatile memory ("NVM") for providing user-defined logic functions. In one aspect, the controller, having a serial peripheral interface ("SPI") port, is capable of processing information based on execution of instructions. NVM, having a memory SPI port, is configured to store configuration data persistently. FPGA includes multiple configurable logic blocks ("LBs") configured to be selectively programmed to perform one or more user-defined logic functions in accordance with the configuration data. FPGA, in one embodiment, includes a master SPI ("MSPI") port which is used to couple to the memory SPI port of NVM and a slave SPI ("SSPI") port which is used to couple to SPI port of controller.

22 Claims, 11 Drawing Sheets

METHOD AND SYSTEM FOR ACCESSING A NONVOLATILE MEMORY VIA SPI PORTS

FIELD

The exemplary embodiment(s) of the present invention relates to the field of semiconductor devices for computer hardware and software. More specifically, the exemplary embodiment(s) of the present invention relates to field-programmable gate array ("FPGA") and non-volatile memory ("NVM").

BACKGROUND

With increasing popularity of digital communication, artificial intelligence (AI), IoT (Internet of Things), and/or robotic controls, the demand for faster, flexible, and efficient hardware and/or semiconductors with processing capabilities is constantly in demand. To meet such demand, high-speed and flexible semiconductor chips are generally more desirable. One conventional approach to satisfy such demand is to use dedicated custom integrated circuits and/or application-specific integrated circuits ("ASICs"). A shortcoming with the ASIC approach is that it lacks flexibility while consuming a large amount of resource.

An alternative approach, which enjoys the growing popularity, is utilizing programmable semiconductor devices ("PSDs") such as programmable logic devices ("PLDs") or field-programmable gate arrays ("FPGAs"). A feature of PSD is that it allows an end-user to program and/or reprogram one or more desirable functions to suit his/her applications after the PSD is fabricated. A drawback, however, associated with a conventional FPGA or PLD is that it has a limited capability to access and/or update configuration data after it is stored in an external memory. A conventional approach to access and/or update configuration data is to use JTAG (Joint Test Action Group) operation(s). A drawback associated with JTAG is that it typically is slow and/or cumbersome to operate.

SUMMARY

A port-bridging memory access ("PMA") system containing FPGA, controller, and NVM is disclosed. The controller, having a serial peripheral interface ("SPI") port, is capable of processing information based on execution of instructions. NVM, having a memory SPI port, is configured to store configuration data persistently. FPGA includes multiple configurable logic blocks ("LBs") configured to be selectively programmed to perform one or more user-defined logic functions in accordance with the configuration data. FPGA, in one embodiment, includes a master SPI ("MSPI") port which is used to couple to memory SPI port of NVM and a slave SPI ("SSPI") port which is used to couple to SPI port of controller.

A method of PMA provides a memory access between a controller such as microcontroller unit ("MCU") and NVM via FPGA. Upon electing number of SPI data bits for SPI bandwidth, SPI port of controller is coupled to an SSPI port of FPGA via a first SPI connection or bus. After connecting MSPI port of FPGA to a memory SPI port of NVM via a second SPI connection, a bitstream of configuration data is forwarded from controller to NVM via the first SPI connection and the second SPI connection.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
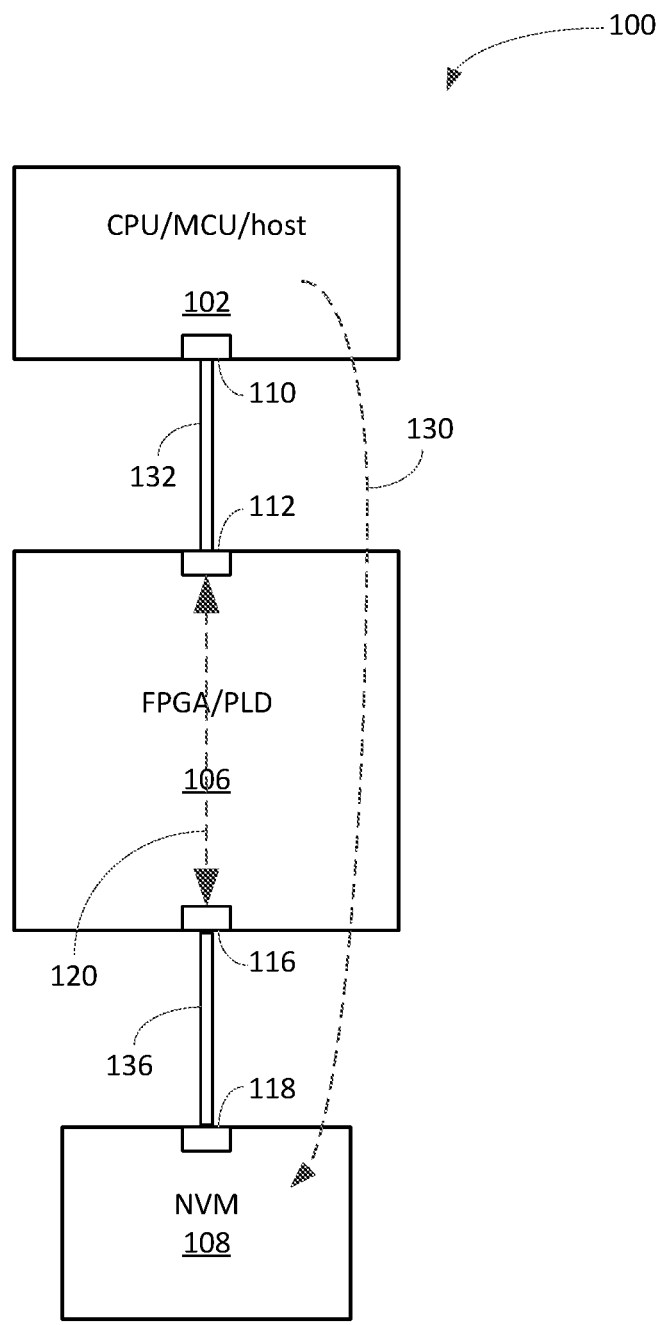
FIG. 1 is a block diagram illustrating a PMA system capable of establishing a DSC via at least two SPI ports in FPGA in accordance with one embodiment of the present invention.

Embodiments of the present invention disclose a method(s) and/or apparatus for facilitating memory access between controller and NVM via FPGAs.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

An embodiment of the presently claimed invention discloses a PMA system for memory access via a direct SPI connection ("DSC"). The PMA system includes FPGA, controller, and NVM for facilitating establishing DSC. In one example, the controller such as MCU has an SPI port and is able to process information based on executable instructions in execution memory. NVM such as SPI flash has an SPI port (or a memory SPI port) and can store configuration data persistently. FPGA, containing multiple configurable logic blocks ("LBs"), is configured to be selectively programmed to perform one or more user-defined logic functions in accordance with the configuration data. FPGA, in one embodiment, includes an MSPI port which is used to couple to SPI port of NVM and an SSPI port which is used to couple to SPI port of controller.

Another embodiment of the presently claimed invention discloses a PMA method which provides a memory access between a controller such as MCU and NVM via FPGA. Upon electing number of SPI data bits for SPI bandwidth, SPI port of controller is coupled to an SSPI port of FPGA via a first SPI connection or bus. After connecting MSPI port of FPGA to a memory SPI port of NVM via a second SPI connection, a bitstream of configuration data is forwarded from controller to NVM via the first SPI connection and the second SPI connection.

FIG. 1 is a block diagram illustrating a PMA system 100 capable of establishing a DSC via at least two SPI ports in FPGA in accordance with one embodiment of the present invention. PMA system 100 includes controller 102, FPGA 106, and NVM 108 wherein controller 102 can be a CPU, MCU, processor, and/or host. A function of PMA system 100 is to facilitate accessing memory content stored in NVM 108 via SPI data transmission through FPGA 106. It should be noted that the underlying concept of the exemplary embodiment(s) of the present invention would not change if one or more blocks (circuit or elements) were added to or removed from FIG. 1.

Controller 102 is a computing device capable of processing information based on executable instructions. In one example, controller 102 includes at least one SPI port capable of facilitating SPI data transmission. Controller 102, for instance, can be an MCU containing a 4-bit SPI port. Alternatively, controller 102 can be a processor, CPU, or host capable of facilitating SPI data transmission using SPI ports. Note that SPI port can be a 4-bit (4-wire), 5-bit (5-wire), or 6-bit (6-wire) SPI port. In one aspect, controller 102 can be a die, component, IC, device, and/or an external chip.

NVM 108 is a memory device capable of maintaining its logic values even after its power is disconnected. NVM 108, for instance, is NOR flash memory able to store configuration data persistently. In one example, NVM 108 is an SPI flash memory containing a 4-bit (4-wire) port, SPI port, or memory SPI port for coupling to one or more SPI bus. SPI flash or flash memory is generally a small and/or low-power flash memory capable of facilitating serial data access. SPI flash memory is applicable to an embedded or peripheral environment. SPI ports and/or buses are used for SPI data transmission based on SPI protocol. In one embodiment, NVM 108 is SPI flash memory configured to store configuration data or bitstream for configuring at least a portion of FPGA 106.

FPGA 106 is a semiconductor device, chip, integrated circuit ("IC"), or die containing multiple configurable LBs interconnected by configurable interconnects. FPGA 106, also known as programmable logic device ("PLD") or programmable semiconductor device ("PSD"), can be selectively programmed to perform one or more user-defined logic functions in accordance with the configuration data. It should be noted that FPGAs or PLDs can be programmed and/or reprogrammed to user desired logic functions after FPGA is manufactured.

FPGA 106, in one embodiment, includes and MSPI port 116 and SSPI port 112. While MSPI port 116 is used to couple to a memory SPI port 118 of NVM 108, SSPI port 112 is used to couple to SPI port 110 of controller 102. Depending on the applications, SPI ports 110 and 112 are coupled by an SPI bus or channel 132. Also, SPI ports 116 and 118 are coupled by an SPI bus or channel 136.

FPGA 106, in one example, further includes an embedded configuration memory configured to store a configuration bitstream loaded from NVM 108. Note that the configuration data or bitstream is configuration information used to configure or program FPGA 106. In one aspect, upon receipt a direct-memory access command, FPGA 106 is able to connect MSPI port 116 to SSPI port 112 using a port-bridging hardware or DSC as indicated by numeral 120. In an alternative embodiment, MSPI port 116 or SSPI port 112 can be configured and/or elected to a 1-bit SPI transmission or a 4-bit SPI transmission based on the SPI bandwidth command.

An advantage of using the PMA system is that it enables controller 102 to directly access content of NVM 108 using DSC as indicated by numeral 130.

Figure 2:
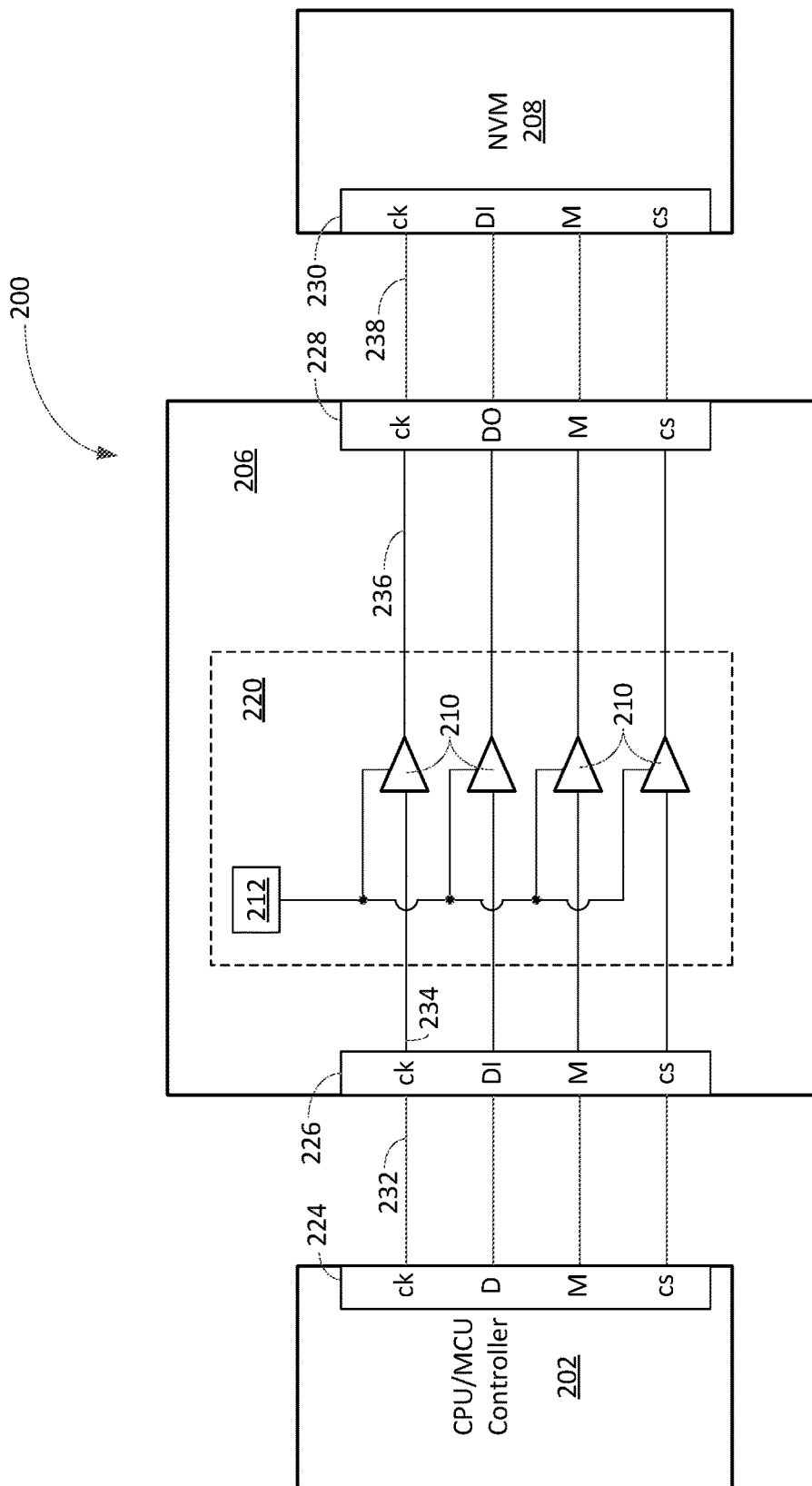
FIG. 2 is a block diagram illustrating a PMA system having a port-bridge situated between two ports in FPGA for facilitating a DSC in accordance with one embodiment of the present invention.

FIG. 2 is a block diagram illustrating a PMA system 200 having a port-bridge situated between two ports in FPGA for facilitating a DSC in accordance with one embodiment of the present invention. PMA system 200, which is similar to PMA system 100 shown in FIG. 1, includes MCU 202, FPGA 206, and NVM 208 wherein MCU 202 is a processing device. MCU, for example, is a relatively simple and/or small computing IC chip containing a processor, memory, and configurable input/output ("I/O") ports. I/O ports of MCU may include one or more SPI ports such as port 224. It should be noted that the underlying concept of the exemplary embodiment(s) of the present invention would not change if one or more blocks (circuit or elements) were added to or removed from FIG. 2.

MCU 202, in one example, includes a 4-bit or 4-wire SPI port 224 containing a clock bit (ck), data bit (D), mode bit (M), and chip select bit (cs). It should be noted that SPI is a synchronous serial interface protocol used for various peripheral applications, such as, but not limited to, embedded systems, chip-to-chip communications, IC-to-IC couplings, and/or device-to-device connections. The SPI architecture generally supports master-slave configurations for data transmissions. A master device, for example, initiates a read and/or write operation via clock management. In some applications, multiple slave-devices may be used wherein a slave device can be selected by master via cs. While SPI data transmission is beneficial as short-distance data transmission, SPI buses are generally used for coupling SPI ports.

SPI bus, also known as four-wire serial bus, SPI connection, or SPI channel, contains a serial clock ("SCLK"), a master out slave in ("MOSI"), a master in slave out ("MISO"), and a chip select ("CS"). While SCLK represents serial clock signals outputting from a master, MOSI provides data output from the master. MISO indicates data output from a slave. CS elects one of several slaves as an intended slave for receiving the data.

SPI interface also covers more than 1-bit data wire, such as, but not limited to, dual SPI ("DSPI") or quad SPI ("QSPI"). According to SPI interface protocol, a dual SPI uses two data pins with a half-duplex configuration for transmitting two bits of data per each clock cycle. A mode select command can be issued by a host or controller for selecting SPI bandwidth. For example, a host can issue a mode select command for selecting DSPI for the upcoming SPI transmission. QSPI is a serial interface with four (4) data lines for read and write operations. In one example, QSPI contains at least six (6) wires wherein four (4) of the six wires are dedicated to data bits. With four (4) data lines or wires, QSPI can transmit larger volume of data concurrently, which can be useful for memory-intensive data transmission or FPGA configuration data.

NVM 208, which is similar to NVM 108 shown in FIG. 1, is a memory device capable of maintaining its logic values persistently. NVM 208, in one embodiment, is an SPI flash memory for storing configuration data or configuration bitstream. NVM 208 contains a 4-bit or 4-wire port, SPI port, or memory SPI port 230. SPI port 230 support 4 wires of clock bit (ck), data-in bit (DI), mode bit (M), and chip select bit (cs). In an alternative embodiment, SPI port 230 can also be configured to support DSPI protocol or QSPI protocol.

FPGA 206, which is similar to FPGA 106 shown in FIG. 1, is a semiconductor IC capable of performing one or more user-defined logic functions in accordance with the configuration data. FPGA 206 includes a port-bridge 220 which connects SSPI port 226 to MSPI port 228 for facilitating DSC. In one embodiment, port-bridge 220 is a dedicated hardware used for facilitating a bridge function between ports 226-228. Alternatively, port-bridge 220 is a combination of BLs and configurable connections for performing a bridging function connecting ports 226-228.

Port-bridge 220 includes a selecting logic 212 and multiple selectors 210. Selecting logic 212 manages selectors 210 to indicate whether a DSC should be established between ports 226-228. In one embodiment, selecting logic 212 receives instruction relating to DSC from an external device such as MCU 202 or host. Alternatively, selecting logic 212 is configured in accordance with configuration bitstream.

In operation, when selecting logic 212 initiates a DSC command which is fed to selectors 210 indicating to establish a bridge, selectors 210 facilitate to connect ck of port 226 to ck of port 228 for allowing clock signals to travel from MCU 202 to NVM 208 via ports 224-230 as indicated by numerals 232-238. Selectors 210 is further coupling DI of port 226 to DO of port 228, M of port 226 to M of port 228, and cs of port 226 to cs of port 228 when a DSC command is issued. It should be noted that the configuration will be adjusted if DSPI or QSPI mode is selected. When selecting logic 212 is deactivated, the bridge between port 226-228 is open so that there is no direct connection between ports 226-228.

An advantage of using PMA system is to allow a user to access NVM 208 via a bridging device facilitated by FPGA.

Figure 3:
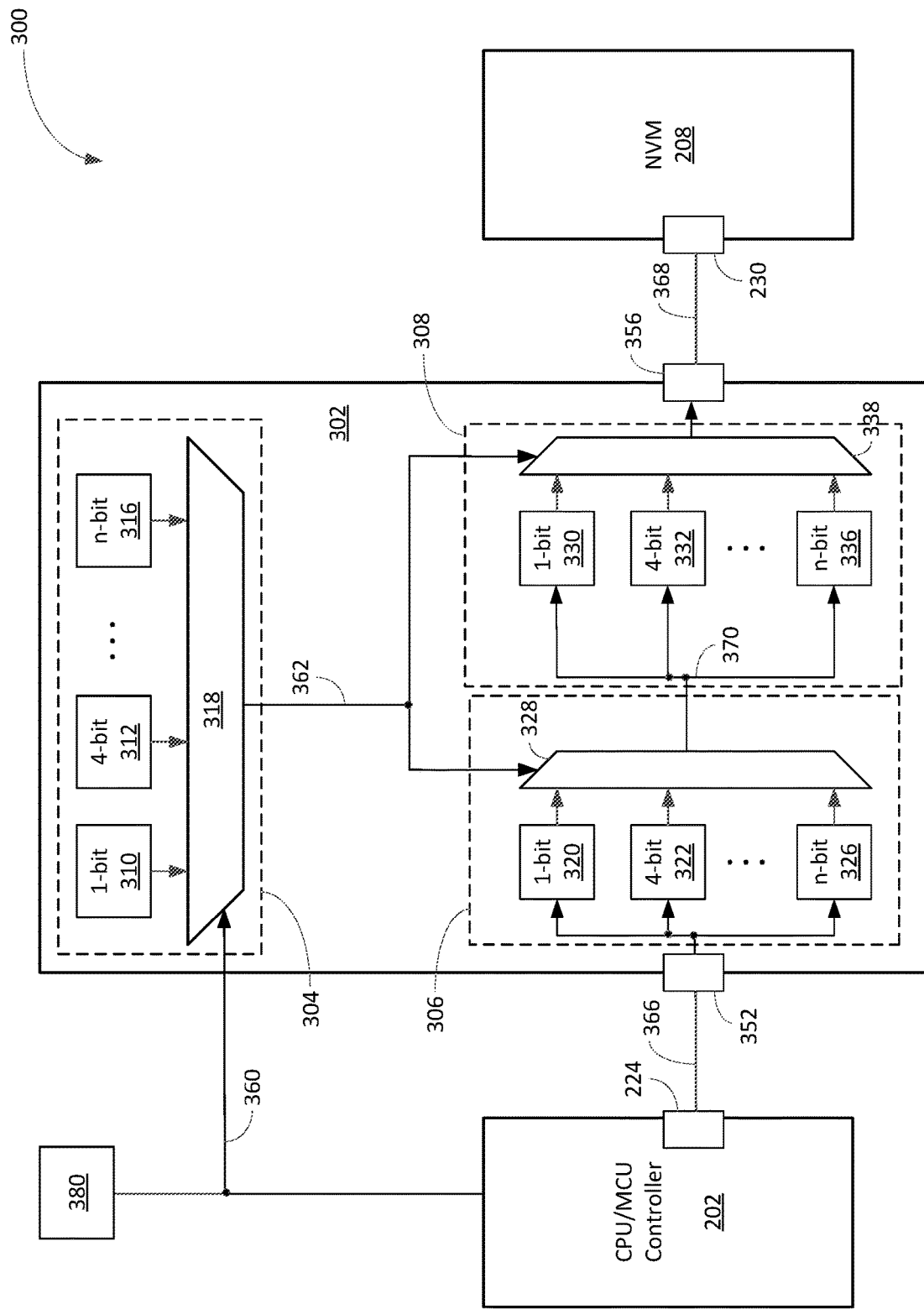
FIG. 3 is a logic block diagram illustrating an alternative feature of PMA system for configuring or selecting SPI bandwidth in accordance with one embodiment of the present invention.

FIG. 3 is a logic flow block diagram illustrating an alternative feature of PMA system 300 for configuring or selecting SPI bandwidth in accordance with one embodiment of the present invention. PMA system 300 is the same or similar to PMA system 200 shown in FIG. 2 except that PMA system 300 illustrates an SPI bandwidth selector or SPI bandwidth logic. A function of SPI bandwidth selector is to elect 1-bit data, 2-bit data, 4-bit data, or n-bit data for SPI data transmission. It should be noted that the underlying concept of the exemplary embodiment(s) of the present invention would not change if one or more blocks (circuit or elements) were added to or removed from FIG. 3.

PMA system 300, in one embodiment, includes MCU 202, NVM 208, and FPGA 302 which is used to set, program, or change SPI bandwidth based on external or internal bandwidth command(s). FPGA 302 is similar to FPGA 202 illustrated in FIG. 2 except that FPGA 302 includes SPI bandwidth selector. SPI bandwidth selector, in one embodiment, includes a bandwidth selector 304, an input bandwidth selector 306, and an output bandwidth selector 308. A function of SPI bandwidth selector is to provide a selection of SPI bandwidth based on an applicable environment.

Bandwidth selector 304, in one embodiment, includes multiple data bit blocks 310-316 and a selecting gate 318. In one example, 1-bit block 310 indicating one (1) data bit is used for the upcoming SPI data transmission. Alternatively, 4-bit block 312 indicates four (4) data bits is used for the next SPI data transmission. Also, n-bit block 316 indicates n data bits is used for the next SPI data transmission wherein n bit can be, but not limited to, two (2) data bits, eight (8) data bits, and/or sixteen (16) data bits. Selecting gate 318, in one embodiment, is used to control or manage selected bandwidth 362 based on bandwidth command 360. Bandwidth command can be issued by MCU 202. Alternatively, bandwidth command 360 can also be provided by an external device as indicated by numeral 380. In addition, bandwidth command 360 can be generated by programmable BLs in FPGA 302 in accordance with the configuration data. The output of selecting gate 318 is a selected bandwidth 362 which will be fed to bandwidth selectors 306-308 for the upcoming SPI communication.

Input bandwidth selector 306, includes 1-bit input data block 320, 4-bit input data block 322, and n-bit input data block 326, and input SPI bandwidth selecting gate 328. Input data blocks 320-326 are coupled to SPI port 352 which is further coupled to SIP port 224 of MCU 202 via an SPI bus 366. In one embodiment, SPI port 352 is capable of handling 1-bit, 2-bit, 4-bit, and/or n-bit input data transmitted by an SPI data transmission. Input SPI bandwidth selecting gate 328, in one example, is controlled by selected bandwidth 362. SPI bandwidth selecting gate 328 generates an input bandwidth 370 which is subsequently fed to output bandwidth selector 308.

Output bandwidth selector 308 includes 1-bit output data block 330, 4-bit output data block 332, and n-bit output data block 336, and output SPI bandwidth selecting gate 338. Output data blocks 330-336 are coupled to SPI port 356 which is further coupled to SIP port 230 of NVM 208 via an SPI bus 368. In one embodiment, SPI port 356 is capable of handling 1-bit, 2-bit, 4-bit, and/or n-bit output data transmitted by an SPI data transmission. Output SPI bandwidth selecting gate 338, in one example, is controlled by selected bandwidth 362. SPI bandwidth selecting gate 338 generates an output bandwidth which is subsequently fed to SPI port 356 for the upcoming SPI data transmission.

In operation, upon receipt of bandwidth command 360, a selected bandwidth 362 is generated based on command 360. After receipt of the input data based on selected bandwidth 362, SPI port 352 receives and processes data transmitted from MCU 202 based on selected bandwidth 362. The received and/or processed data is subsequently forwarded to SPI port 356 according to selected bandwidth 362. An advantage of employing SPI bandwidth selector is that it provides additional flexibility of handling SPI data bits with different modes.

Figure 4:
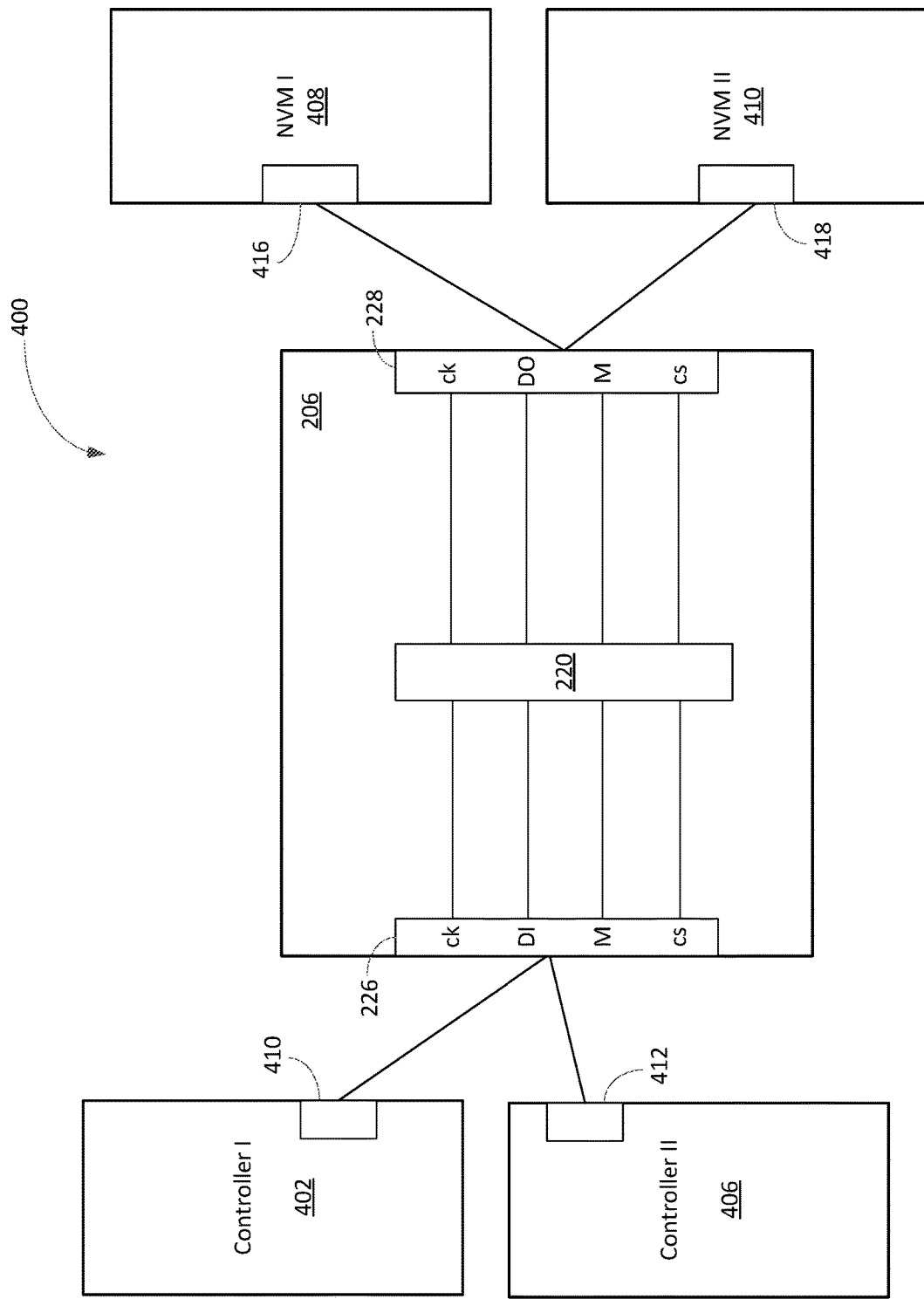
FIG. 4 is a block diagram illustrating an alternative embodiment of PMA system layout containing multiple controllers and NVM devices connected by SPI ports of FPGA in accordance with one embodiment of the present invention.

FIG. 4 is a block diagram 400 illustrating an alternative embodiment of PMA system layout containing multiple masters (e.g., controllers or MCUs) and multiple slaves (e.g., NVMs or SPI flash devices) connected by SPI ports 226-228 of FPGA 206 in accordance with one embodiment of the present invention. Diagram 400 includes controller I 402, controller II 406, NVM I 408, NVM II 410, and FPGA 206 wherein FPGA 206 is used to couple to controllers 402-406 and NVMs 408-410. FPGA 206 facilitates connections between two masters 402-406 and two slaves 408-410 using SPI ports 226-228 and 410-418. Depending on the applications, FPGA 206 can be configured to handle and facilitate SPI communications between multiple masters and slaves. It should be noted that the underlying concept of the exemplary embodiment(s) of the present invention would not change if one or more maters and/or slaves were added to or removed from diagram 400.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 5:
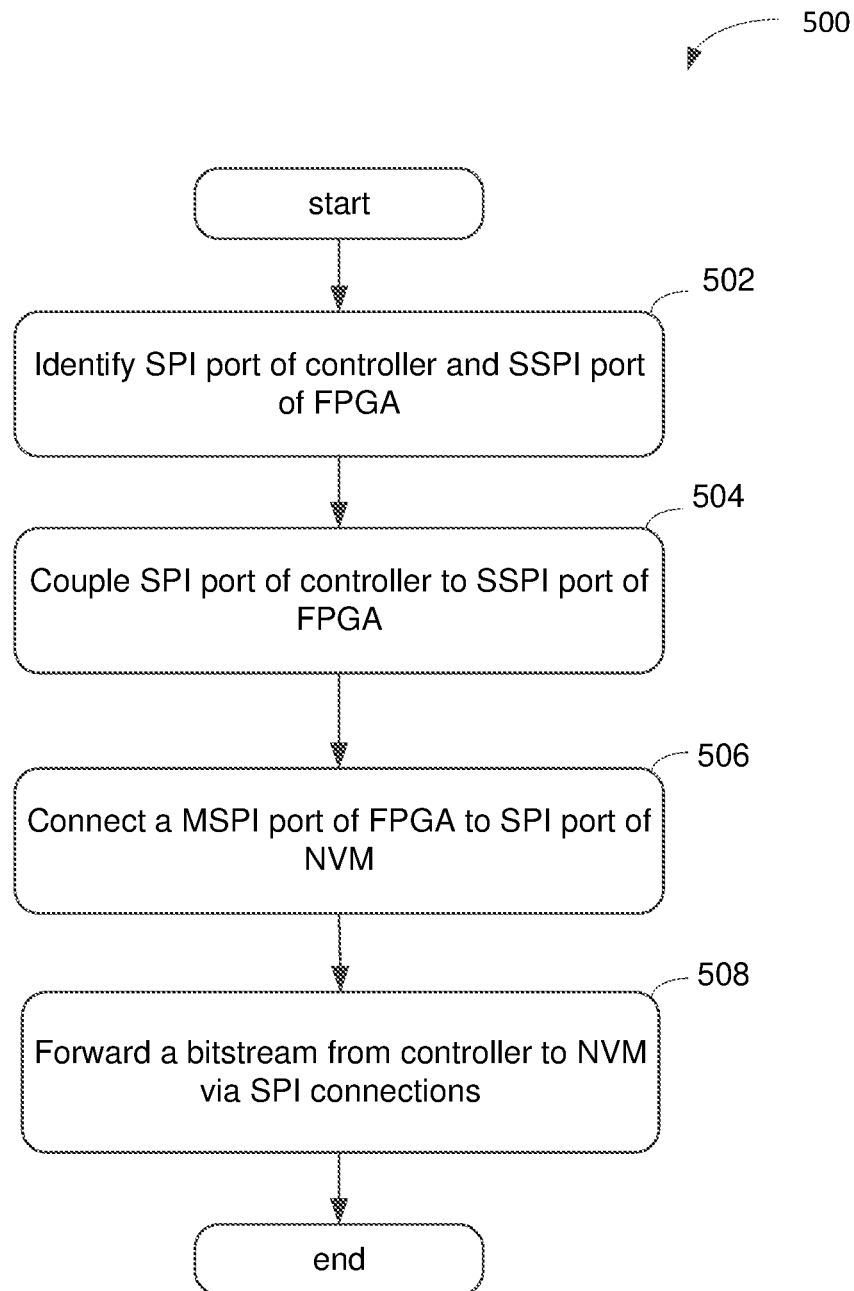
FIG. 5 is a flowchart illustrating a method of PMA establishing a DSC via SPI ports of FPGA in accordance with one embodiment of the present invention.

FIG. 5 is a flowchart 500 illustrating a method of PMA establishing a DSC via SPI ports of FPGA in accordance with one embodiment of the present invention. At block 502, a process of providing a memory access identifies an SPI port of a controller and an SSPI port of FPGA. In one embodiment, the process is capable of determining a 4-bit SPI port associated to a CPU and SSPI port associated to FPGA. Alternatively, the 4-bit SPI port can also be associated to an MCU.

At block 504, SPI port of controller is coupled or logically connected to SSPI port of FPGA via a first SPI connection or an SPI bus. In one aspect, the memory SPI port of NVM and MSPI port of the FPGA are identified for SPI transmission.

At block 506, MSPI port of FPGA is connected to a memory SPI port or SPI port of NVM via a second SPI connection or a second SPI bus. In one embodiment, SSPI port of FPGA is logically connected to MSPI port of FPGA based on a direct memory access command.

At block 508, the process is capable of forwarding a bitstream of configuration data from controller to NVM via the first SPI connection and the second SPI connection through FPGA. In an alternative feature, the process is further capable of electing one of multiple SPI data-bit settings for selecting a proper SPI bandwidth for the upcoming SPI data transmission. For example, the process can elect one (1) data bit SPI transmission or four (4) data bits SPI transmission.

Figure 6:
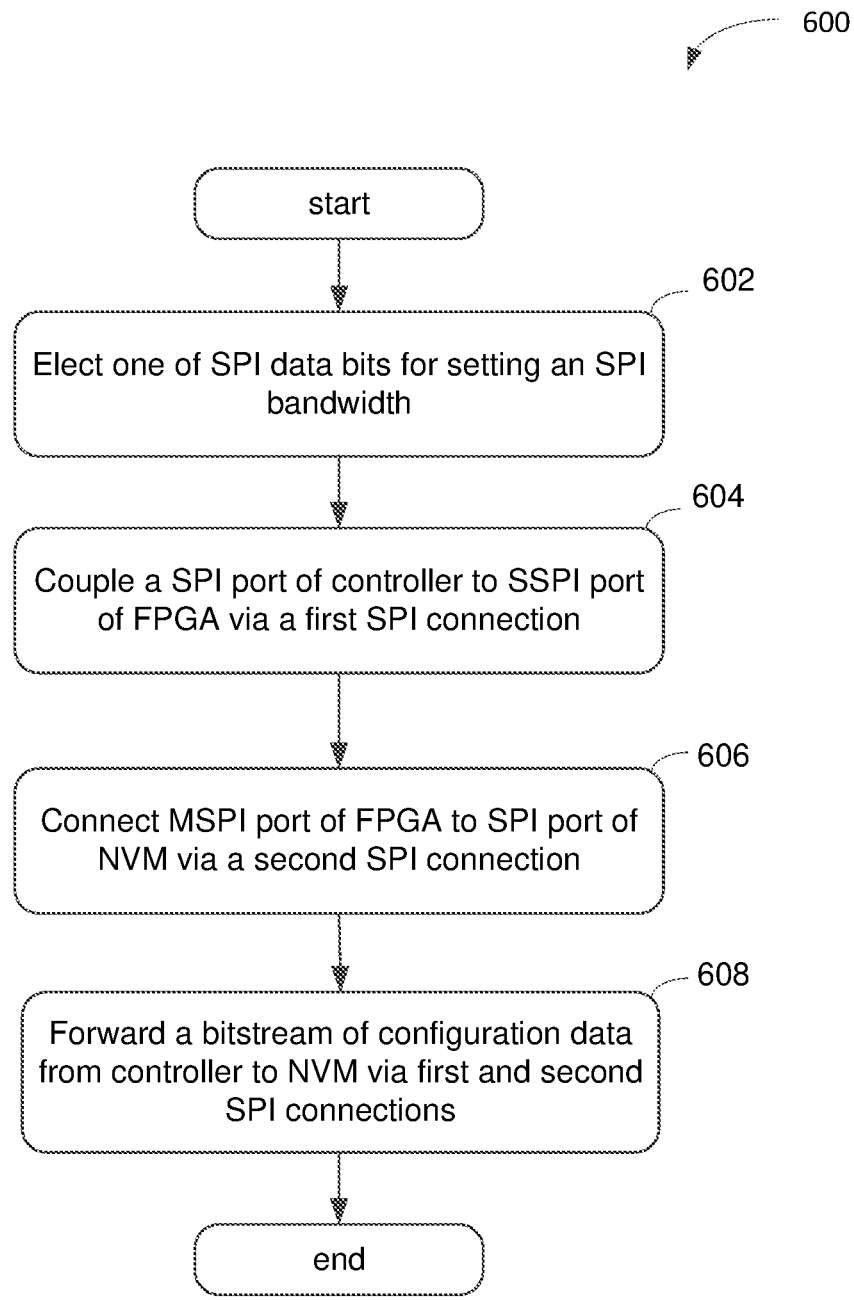
FIG. 6 is a flowchart illustrating a method of PMA system for setting up an SPI transmission bandwidth in accordance with one embodiment of the present invention.

FIG. 6 is a flowchart 600 illustrating a method of PMA system for setting up an SPI transmission bandwidth in accordance with one embodiment of the present invention. At block 602, a process of providing a memory access between controller and NVM elects one of several SPI data bits settings for selecting an SPI bandwidth for the upcoming SPI transmission.

At block 604, SPI port of controller is coupled to SSPI port of FPGA via a first SPI connection or first SPI bus.

At block 606, MSPI port of FPGA is connected to memory SPI port or SPI port of NVM via a second SPI connection or a second SPI bus. For example, SPI port of MCU is logically connected to MSPI port of FPGA for facilitating a first SPI transmission. Alternatively, SPI port of SPI flash memory is logically coupled to MSPI port of FPGA for facilitating a second SPI transmission.

At block 608, the process is able to forward a bitstream of configuration data from controller (e.g., MCU) to NVM (e.g., SPI flash) via the first SPI connection and the second SPI connection. For example, after identifying SPI port of MCU and SSPI port of FPGA for a first SPI transmission, SPI port of SPI flash memory and MSPI port of FPGA are identified for a second SPI transmission. SSPI port of FPGA, for instance, is connected to MSPI port of FPGA based on a direct memory access command. In one aspect, the process is further capable of electing one of 1-bit SPI transmission and 4-bit SPI transmission in accordance with the SPI bandwidth command.

PROGRAMMABLE SEMICONDUCTOR DEVICE (PSD) or FPGA

Figure 7:
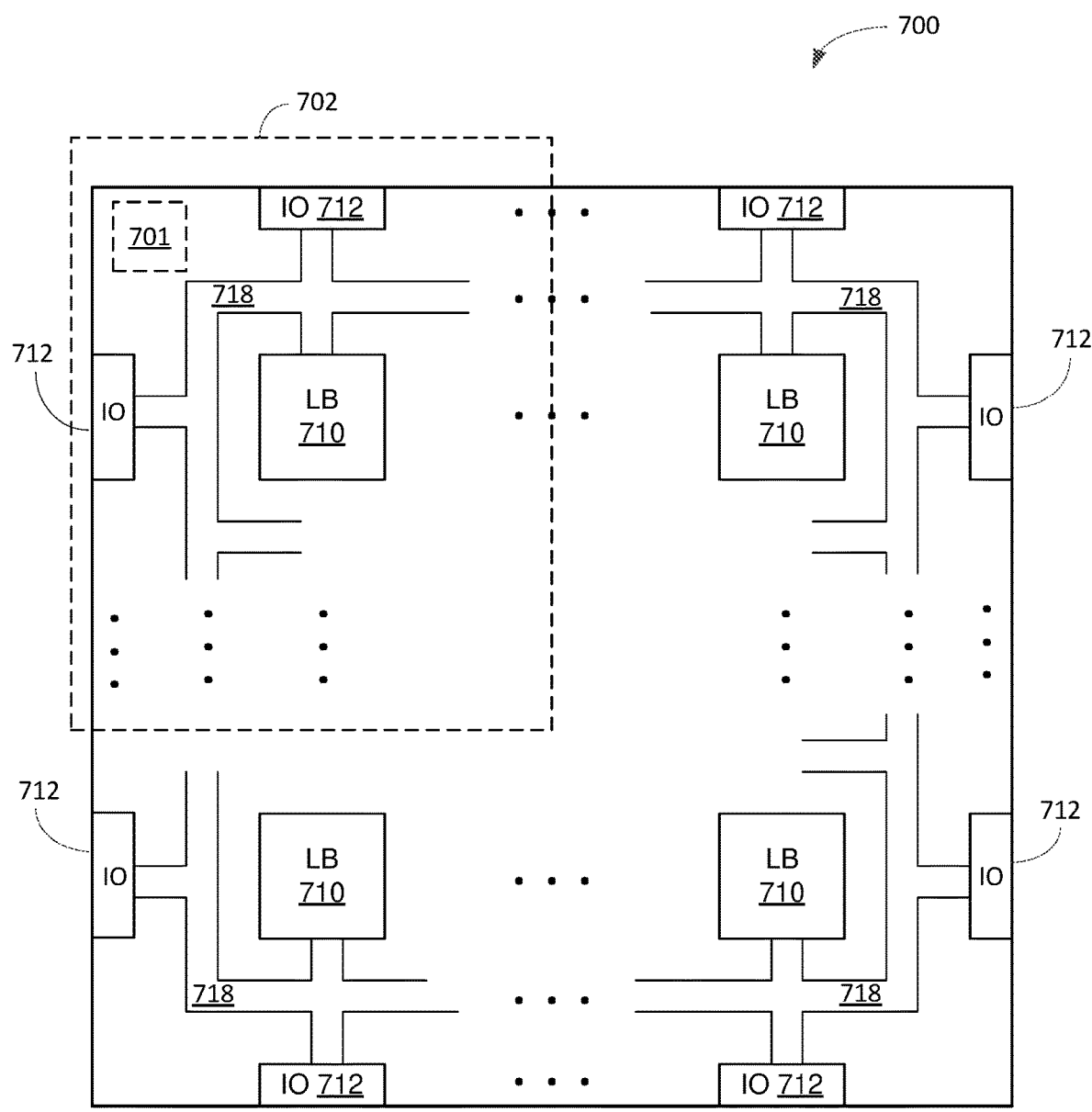
FIG. 7 is a block diagram illustrating an FPGA or a programmable semiconductor device ("PSD") able to facilitate DSC for flexible memory access in accordance with one embodiment of the present invention.

FIG. 7 is a block diagram 700 illustrating an FPGA or a programmable semiconductor device ("PSD") able to facilitate DSC for flexible memory access in accordance with one embodiment of the present invention. PSD, also known as FPGA, PIC, and/or a type of Programmable Logic Device ("PLD"), includes one or more SPI ports capable of facilitating DSC SPI data transmission. In one aspect, PSD includes SPI management logic 701 for handling SPI communication. It should be noted that the underlying concept of the exemplary embodiment(s) of the present invention would not change if one or more blocks (circuit or elements) were added to or removed from diagram 700.

PSD includes an array of configurable LBs 710 surrounded by input/output blocks ("IOs") 712, and programmable interconnect resources 718 ("PIR") that include vertical interconnections and horizontal interconnections extending between the rows and columns of logic block ("LB") 710 and IO 712. PRI 718 may further include interconnecting array decoders ("IAD") or programmable interconnection array ("PIA"). It should be noted that the terms PRI, IAD, and PIA may be used interchangeably hereinafter.

Each LB, in one example, includes programmable combinational circuitry and selectable output registers programmed to implement at least a portion of a user's logic function. The programmable interconnections, connections, or channels of interconnect resources are configured using various switches to generate signal paths between the LBs 710 for performing logic functions. Each IO 712 is programmable to selectively use an IO pin (not shown) of PSD.

PIC, in one embodiment, can be divided into multiple programmable partitioned regions ("PPRs") 702 wherein each PPR 702 includes a portion of LBs 710, some PPRs 718, and IOs 712. A benefit of organizing PIC into multiple PPRs 702 is to optimize management of storage capacity, power supply, and/or network transmission.

Bitstream is a binary sequence (or a file) containing programming information or data for a PIC, FPGA, or PLD. The bitstream is created to reflect the user's logic functions together with certain controlling information. For an FPGA or PLD to function properly, at least a portion of the registers or flipflops in FPGA needs to be programmed or configured before it can function. It should be noted that bitstream is used as input configuration data to FPGA.

Figure 8:
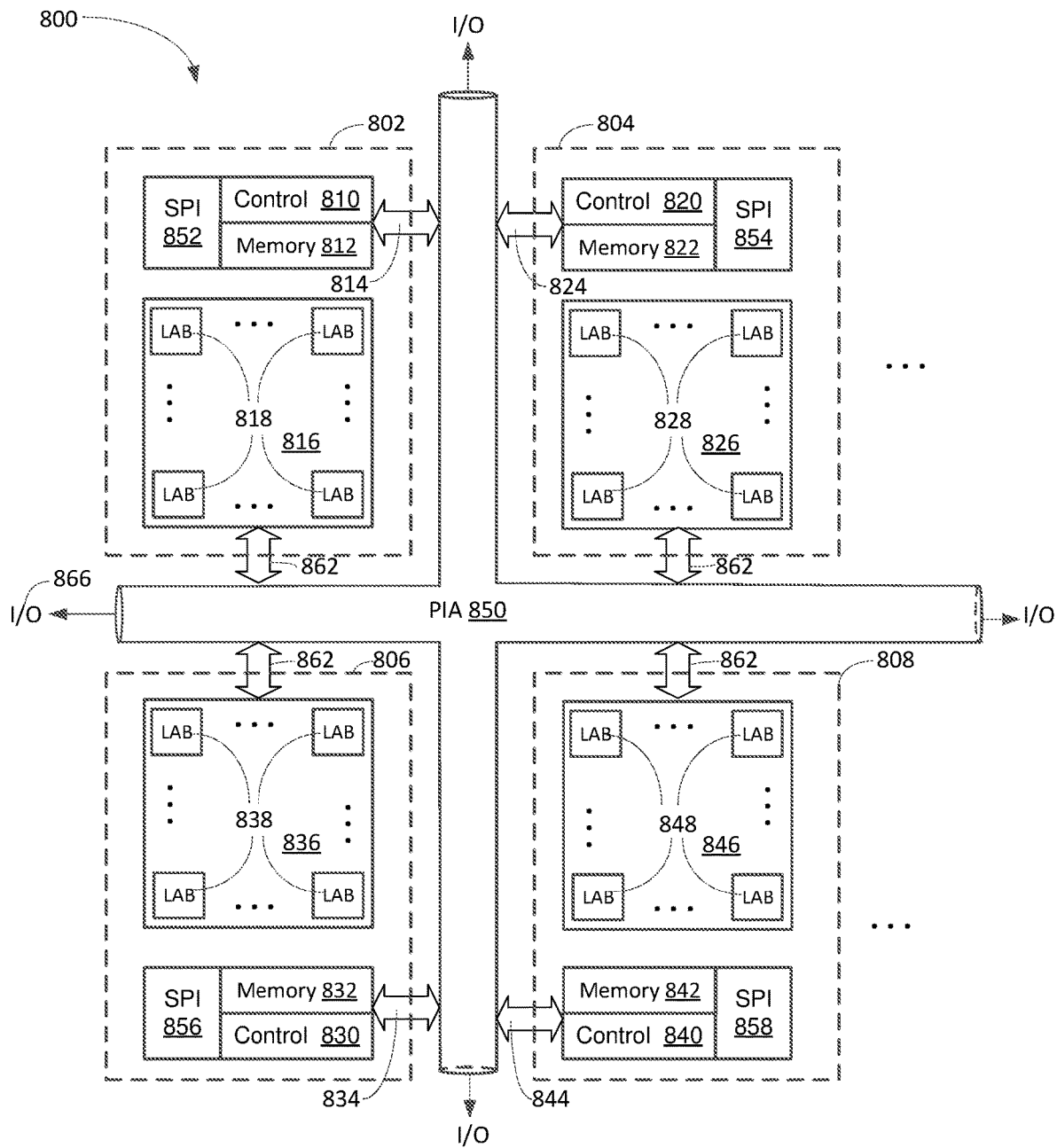
FIG. 8 is a block diagram illustrating at least a portion of FPGA containing programmable logic blocks ("LBs") capable of facilitating user-defined logic functions and flexible memory access in accordance with one embodiment of the present invention.

FIG. 8 is a block diagram 800 illustrating at least a portion of FPGA containing programmable logic blocks ("LBs") capable of facilitating user-defined logic functions and flexible memory access via DSC in accordance with one embodiment of the present invention. Diagram 800 includes multiple programmable partitioned regions ("PPR") 802-808, a programmable interconnection array ("PIA") 850, internal power distribution fabric, and regional input/output ("I/O") ports 866. PPRs 802-808 further includes control units 810, 820, 830, 840, memories 812, 822, 832, 842, configurable SPIs 852-858, and logic blocks ("LBs") 816, 826, 836, 846. Note that control units 810, 820, 830, 840 can be configured into one single control unit, and similarly, memory 812, 822, 832, 843 can also be configured into one single memory device for storing configurations. Furthermore, configurable SPIs 852-858 can also be to combined into one single programmable SPI. It should be noted that the underlying concept of the exemplary embodiment(s) of the present invention would not change if one or more blocks (circuit or elements) were added to or removed from diagram 800.

LBs 816, 826, 836, 846, include multiple LABs 818, 828, 838, 848, wherein each LAB can be further organized to include, among other circuits, a set of programmable logical elements ("LEs") or macrocells, not shown in FIG. 8. Each LAB, in one example, may include anywhere from 32 to 512 programmable LEs. I/O pins (not shown in FIG. 8), LABs, and LEs are linked by PIA 850 and/or other buses, such as buses 862, 814, 824, 834, 844, for facilitating communication between PIA 850 and PPRs 802-808.

Each LE includes programmable circuits such as the product-term matrix, and registers. For example, every LE can be independently configured to perform sequential and/or combinatorial logic operation(s). It should be noted that the underlying concept of PSD would not change if one or more blocks and/or circuits were added or removed from PSD.

Control units 810, 820, 830, 840, also known as configuration logics, can be a single control unit. Control unit 810, for instance, manages and/or configures individual LE in LAB 818 based on the configuration stored in memory 812. It should be noted that some I/O ports or I/O pins are configurable so that they can be configured as input pins and/or output pins. Some I/O pins are programmed as bi-directional I/O pins while other I/O pins are programmed as unidirectional I/O pins. The control units such as unit 810 is used to handle and/or manage PSD operations in accordance with system clock signals.

LBs 816, 826, 836, 846 are programmable by the end user(s). Depending on the applications, LBs can be configured to perform user specific functions based on a predefined functional library facilitated by configuration software. PSD, in some applications, also includes a set fixed circuits for performing specific functions. For example, PSD can include a portion of semiconductor area for a fixed non-programmable processor for enhance computation power.

PIA 850 is coupled to LBs 816, 826, 836, 846 via various internal buses such as buses 814, 824, 834, 844, 862. In some embodiments, buses 814, 824, 834, 844, and 862 are part of PIA 850. Each bus includes channels or wires for transmitting signals. It should be noted that the terms channel, routing channel, wire, bus, connection, and interconnection are referred to the same or similar connections and will be used interchangeably herein. PIA 850 can also be used to receives and/or transmits data directly or indirectly from/to other devices via I/O pins and LABs.

A function of SPI logic such as SPI 852 is a special purpose transmission unit capable of transmitting or receiving information between FPGA and an external device via one or more SPI ports.

Figure 9:
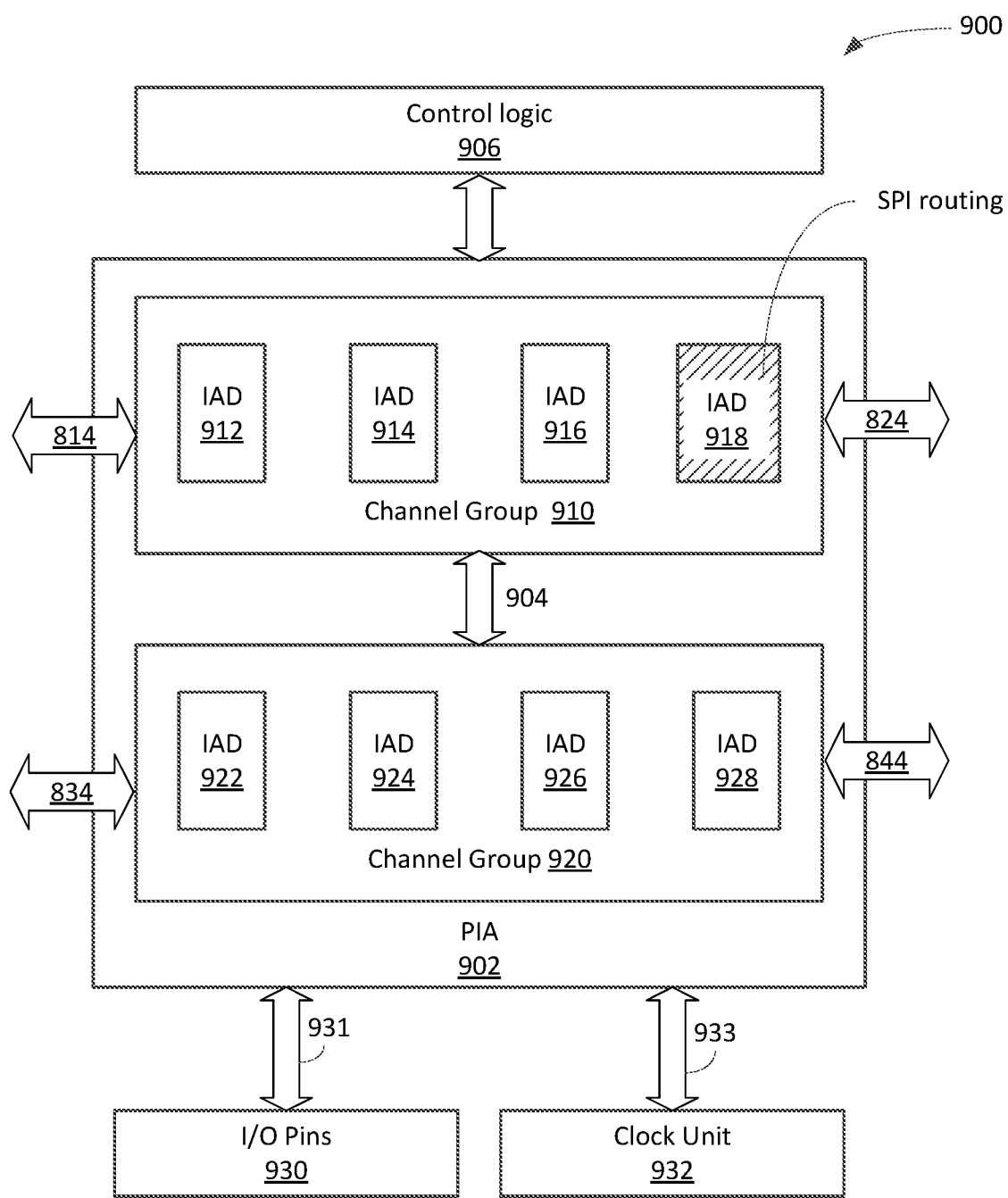
FIG. 9 is a block diagram illustrating a routing logic or routing fabric containing programmable interconnection arrays in FPGA for facilitating SPI routing in accordance with one embodiment of the present invention.

FIG. 9 is a block diagram 900 illustrating a routing logic or routing fabric containing programmable interconnection arrays in FPGA for facilitating SPI routing in accordance with one embodiment of the present invention. Diagram 900 includes control logic 906, PIA 902, I/O pins 930, and clock unit 932. Control logic 906, which may be similar to control units shown in FIG. 8, provides various control functions including channel assignment, differential I/O standards, and clock management. Control logic 906 may contain volatile memory, non-volatile memory, and/or a combination of volatile and nonvolatile memory device for storing information such as configuration data. In one embodiment, control logic 906 is incorporated into PIA 902. It should be noted that the underlying concept of the exemplary embodiment(s) of the present invention would not change if one or more blocks (circuit or elements) were added to or removed from diagram 900.

I/O pins 930, connected to PIA 902 via a bus 931, contain multiple programmable I/O pins configured to receive and/or transmit signals to external devices. Each programmable I/O pin, for instance, can be configured to input, output, and/or bi-directional pin. Depending on the applications, I/O pins 930 may be incorporated into control logic 906.

Clock unit 932, in one example, connected to PIA 902 via a bus 933, receives various clock signals from other components, such as a clock tree circuit or a global clock oscillator. Clock unit 932, in one instance, generates clock signals in response to system clocks as well as reference clocks for implementing I/O communications. Depending on the applications, clock unit 932, for example, provides clock signals to PIA 902 including reference clock(s).

PIA 902, in one aspect, is organized into an array scheme including channel groups 910 and 920, bus 904, and I/O buses 814, 824, 834, 844. Channel groups 910, 920 are used to facilitate routing information between LBs based on PIA configurations. Channel groups can also communicate with each other via internal buses or connections such as bus 904. Channel group 910 further includes interconnect array decoders ("IADs") 912-918. Channel group 920 includes four IADs 922-928. A function of IAD is to provide a configurable routing resources for data transmission.

IAD such as IAD 912 includes routing multiplexers or selectors for routing signals between I/O pins, feedback outputs, and/or LAB inputs to reach their destinations. For example, an IAD can include up to 36 multiplexers which can be laid out in four banks wherein each bank contains nine rows of multiplexers. It should be noted that the number of IADs within each channel group is a function of the number of LEs within the LAB.

PIA 902, in one embodiment, designates a special IAD such as IAD 918 for handling SPI routing. For example, IAD 918 is designated to handle connections and/or routings between SPI ports and LABs to facilitate data transmission. It should be noted that additional IADs may be allocated for handling SPI operations.

Figure 10:
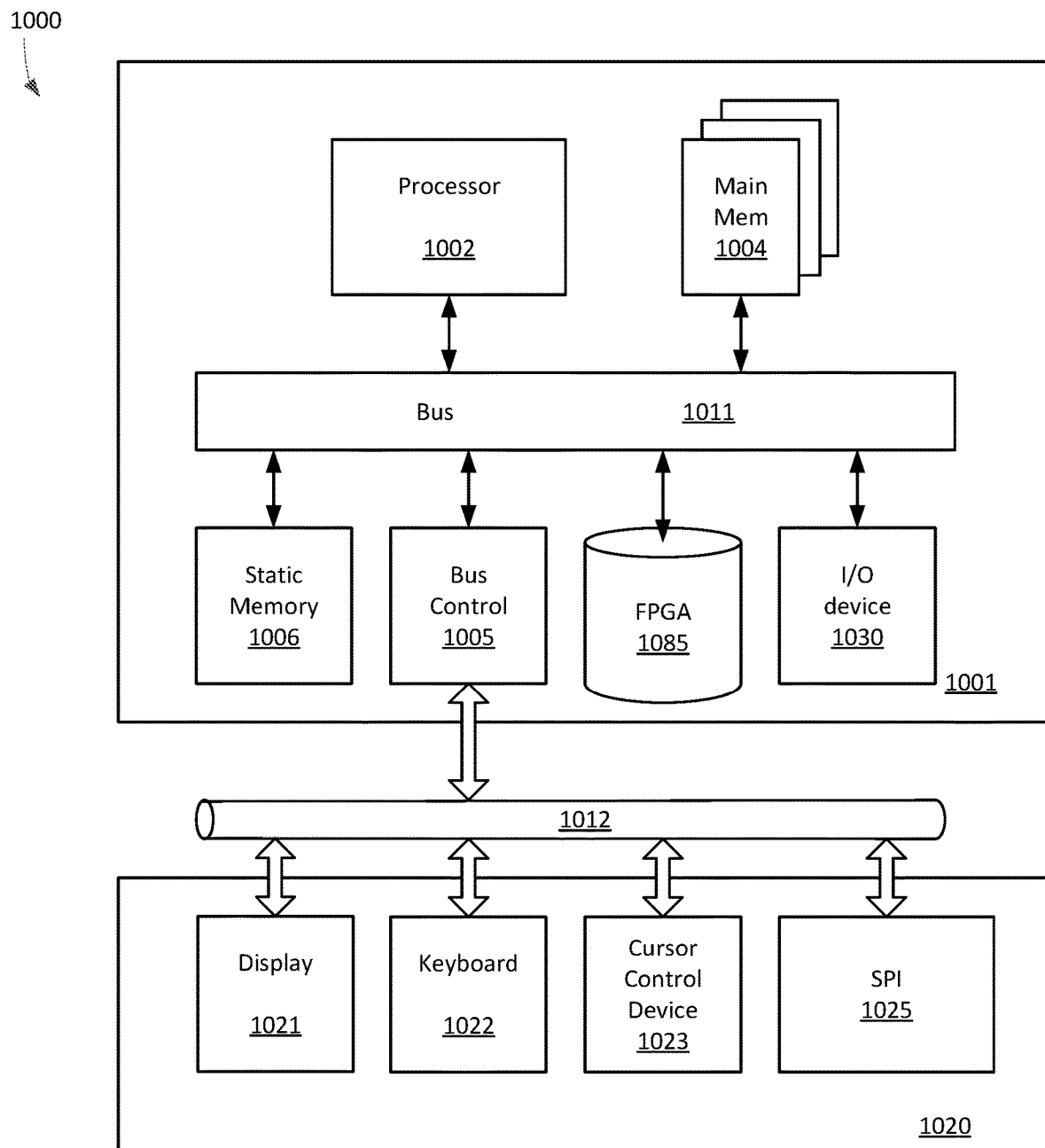
FIG. 10 is a diagram illustrating a digital processing system such as a processor, controller, MCU, and/or CPU capable of directly accessing an SPI flash via an FPGAs in accordance with one embodiment of the present invention.

FIG. 10 is a diagram 1000 illustrating a digital processing system such as a processor, controller, MCU, and/or CPU capable of directly accessing an SPI flash via FPGA in accordance with one embodiment of the present invention. Computer system 1000 includes a processing unit 1001, an interface bus 1012, and an input/output ("IO") unit 1020. Processing unit 1001 includes a processor 1002, main memory 1004, system bus 1011, static memory device 1006, bus control unit 1005, I/O element 1030, and FPGA 1085. It should be noted that the underlying concept of the exemplary embodiment(s) of the present invention would not change if one or more blocks (circuit or elements) were added to or removed from FIG. 10.

Bus 1011 is used to transmit information between various components and processor 1002 for data processing. Processor 1002 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, Ryzen™, AMD® family processors, or Power PC™ microprocessor.

Main memory 1004, which may include multiple levels of cache memories, stores frequently used data and instructions. Main memory 1004 may be RAM (random access memory), MRAM (magnetic RAM), or flash memory. Static memory 1006 may be a ROM (read-only memory), which is coupled to bus 1011, for storing static information and/or instructions. Bus control unit 1005 is coupled to buses 1011-1012 and controls which component, such as main memory 1004 or processor 1002, can use the bus. Bus control unit 1005 manages the communications between bus 1011 and bus 1012. Mass storage memory or SSD which may be a magnetic disk, an optical disk, hard disk drive, floppy disk, CD-ROM, and/or flash memories are used for storing large amounts of data.

I/O unit 1020, in one embodiment, includes a display 1021, keyboard 1022, cursor control device 1023, and PLD 1025. Display device 1021 may be a liquid crystal device, cathode ray tube ("CRT"), touch-screen display, or other suitable display device. Display 1021 projects or displays images of a graphical planning board. Keyboard 1022 may be a conventional alphanumeric input device for communicating information between computer system 1000 and computer operator(s). Another type of user input device is cursor control device 1023, such as a conventional mouse, touch mouse, trackball, or other type of cursor for communicating information between system 1000 and user(s).

SPI 1025 is coupled to bus 1012 for managing SPI transmission such as SPI ports and SPI transmission bandwidth. Computer system 1000 may be coupled to a number of servers via a network infrastructure as illustrated in the following discussion.

Figure 11:
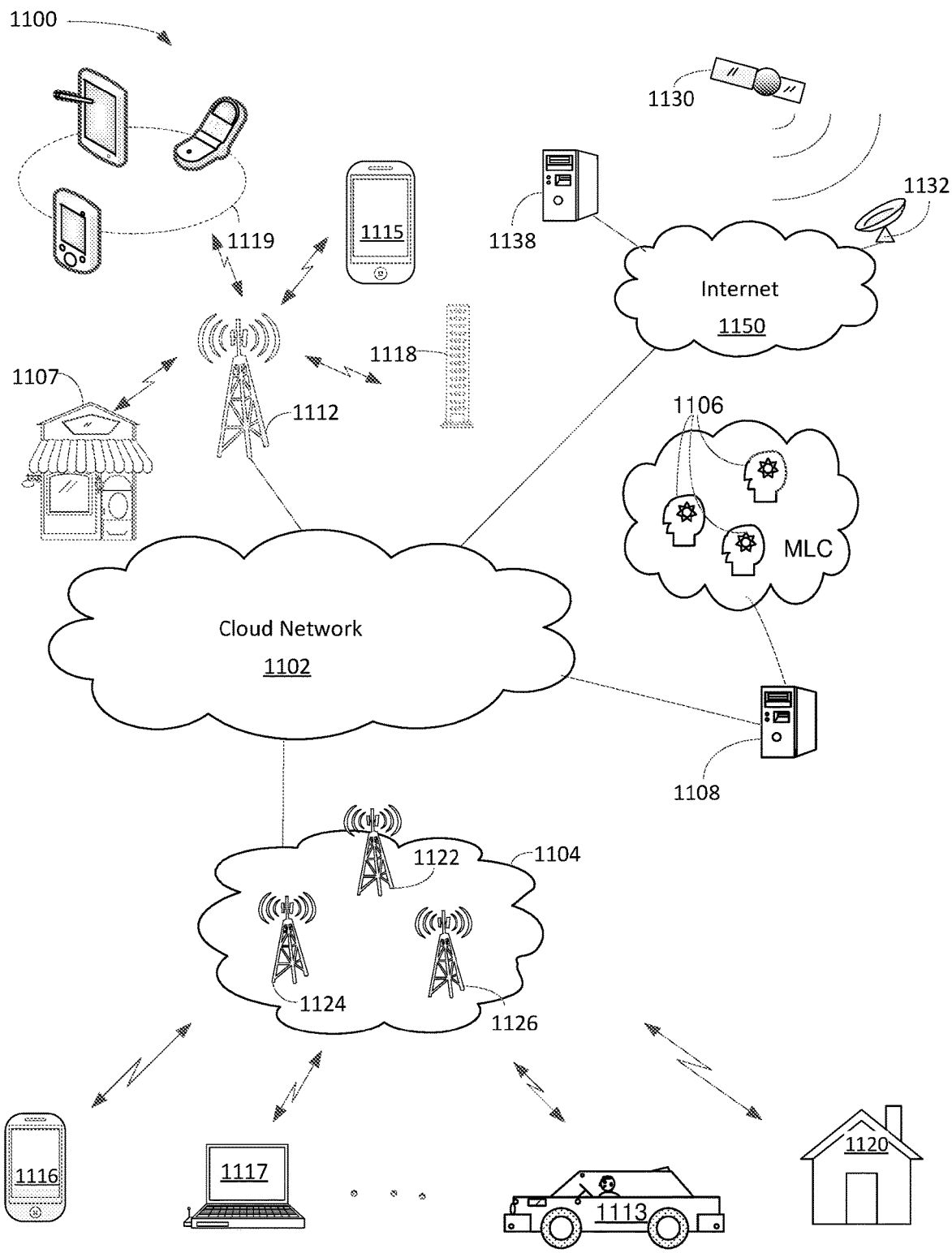
FIG. 11 is a diagram illustrating a network system or a cloud-based system environment using one or more FPGAs to provide DSCs in accordance with one embodiment of the present invention.

FIG. 11 is a diagram 1100 illustrating a network system or a cloud-based system environment using one or more FPGAs to provide DSCs in accordance with one embodiment of the present invention. Diagram 1100 illustrates AI server 1108, communication network 1102, switching network 1104, Internet 1150, and portable electric devices 1113-1119. Network or cloud network 1102 can be wide area network ("WAN"), metropolitan area network ("MAN"), local area network ("LAN"), satellite/terrestrial network, or a combination of WAN, MAN, and LAN. It should be noted that the underlying concept of the exemplary embodiment(s) of the present invention would not change if one or more blocks (or networks) were added to or removed from diagram 1100.

Network 1102 includes multiple network nodes, not shown in FIG. 11, wherein each node may include mobility management entity ("MME"), radio network controller ("RNC"), serving gateway ("S-GW"), packet data network gateway ("P-GW"), or Home Agent to provide various network functions. Network 1102 is coupled to Internet 1150, AI server 1108, base station 1112, and switching network 1104. Server 1108, in one embodiment, includes machine learning computers ("MLC") 1106.

Switching network 1104, which can be referred to as packet core network, includes cell sites 1122-1126 capable of providing radio access communication, such as 3G ($3^{rd}$ generation), 4G, or 5G cellular networks. Switching network 1104, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 1104 is logically coupling multiple users and/or mobiles 1116-1120 across a geographic area via cellular and/or wireless networks. It should be noted that the geographic area may refer to a campus, city, metropolitan area, country, continent, or the like.

Base station 1112, also known as cell site, node B, or eNodeB, includes a radio tower capable of coupling to various user equipments ("UEs") and/or electrical user equipments ("EUEs"). The term UEs and EUEs are referring to the similar portable devices and they can be used interchangeably. For example, UEs or PEDs can be cellular phone 1115, laptop computer 1117, iPhone®1116, tablets and/or iPad® 1119 via wireless communications. Handheld device can also be a smartphone, such as iPhone®, BlackBerry®, Android®, and so on. Base station 1112, in one example, facilitates network communication between mobile devices such as portable handheld device 1115 or 1119 via wired and/or wireless communications networks. It should be noted that base station 1112 may include additional radio towers as well as other land switching circuitry.

Internet 1150 is a computing network using Transmission Control Protocol/Internet Protocol ("TCP/IP") to provide linkage between geographically separated devices for communication. Internet 1150, in one example, couples to supplier server 1138 and satellite network 1130 via satellite receiver 1132. Satellite network 1130, in one example, can provide many functions as wireless communication as well as global positioning system ("GPS"). It should be noted that WAP can be applied to many fields, such as, but not limited to, smartphones 1115-1116, satellite network 1130, automobiles 1113, AI server 1108, business 1107, and homes 1120.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A system containing a field-programmable gate array ("FPGA") able to perform user-defined logic functions, the system comprising:
    a controller having a serial peripheral interface ("SPI") port and capable of processing information based on executable instructions;
    a non-volatile memory ("NVM") having a memory SPI port and configured to store configuration data persistently; and
    an FPGA containing multiple configurable logic blocks ("LBs") configured to be selectively programmed to perform one or more user-defined logic functions in accordance with the configuration data, the FPGA including a master SPI ("MSPI") port coupling to the memory SPI port of the NVM and a slave SPI ("SSPI") port coupling to the SPI port of the controller.

2. The system of claim 1, wherein the controller is a microcontroller unit ("MCU") containing a 4-bit SPI port.

3. The system of claim 1, wherein the controller is a central processing unit ("CPU") capable of transmitting data via an SPI port.

4. The system of claim 1, wherein the SPI port is one of a 4-bit SPI port and a 6-bit SPI port.

5. The system of claim 1, wherein the NVM is an SPI flash memory.

6. The system of claim 1, wherein the FPGA includes a configuration memory for storing a configuration bitstream loaded from the NVM.

7. The system of claim 1, wherein the FPGA is able to connect the MSPI port to SSPI port in accordance with a memory access command.

8. The system of claim 1, wherein the FPGA is able to elect one of a 1-bit SPI transmission and a 4-bit SPI transmission in accordance with an SPI bandwidth command.

9. A method of providing a memory access between a controller and a non-volatile memory ("NVM") via a field-programmable gate array ("FPGA"), the method comprising:
    identifying a serial peripheral interface ("SPI") port of a controller and a slave SPI ("SSPI") port of FPGA;
    coupling the SPI port of the controller to the SSPI port of FPGA via a first SPI connection;
    connecting a master SPI ("MSPI") port of FPGA to a memory SPI port of the NVM via a second SPI connection; and
    forwarding a bitstream of configuration data from the controller to the NVM via the first SPI connection and the second SPI connection.

10. The method of claim 9, further comprising identifying the memory SPI port of the NVM and the MSPI port of the FPGA for SPI transmission.

11. The method of claim 9, further comprising electing one of a plurality of SPI data bits for setting SPI data transmission bandwidth.

12. The method of claim 9, wherein identifying the SPI port of a controller includes determining a 4-bit SPI port associated to a microcontroller unit ("MCU").

13. The method of claim 9, wherein identifying the SPI port of a controller includes determining a 4-bit SPI port associated to a central processing unit ("CPU").

14. The method of claim 9, further comprising connecting the SSPI port of FPGA to the MSPI port of the FPGA based on a direct memory access command.

15. The method of claim 9, wherein connecting the MSPI port of the FPGA to a memory SPI port of the NVM includes coupling the MSPI port of the FPGA to an SPI port of an SPI flash memory for direct transmission between the controller and the NVM.

16. The method of claim 9, further comprising electing one of a 1-bit SPI transmission and a 4-bit SPI transmission in accordance with an SPI bandwidth command.

17. A method of providing a memory access between a controller and a non-volatile memory ("NVM") via a field-programmable gate array ("FPGA"), the method comprising:
    electing one of a plurality of serial peripheral interface ("SPI") data bits for setting an SPI bandwidth;
    coupling an SPI port of the controller to a slave SPI ("SSPI") port of an FPGA via a first SPI connection;
    connecting a master SPI ("MSPI") port of the FPGA to a memory SPI port of the NVM via a second SPI connection; and
    forwarding a bitstream of configuration data from the controller to the NVM via the first SPI connection and the second SPI connection.

18. The method of claim 17, further comprising:
    identifying an SPI port of a microcontroller unit ("MCU") and the SSPI port of the FPGA for a first SPI transmission; and
    identifying an SPI port of an SPI flash memory and the MSPI port of the FPGA for a second SPI transmission.

19. The method of claim 17, wherein coupling an SPI port of the controller includes connecting an SPI port of a microcontroller unit ("MCU") to the MSPI port of the FPGA for a first SPI transmission.

20. The method of claim 17, wherein connecting the MSPI port of the FPGA includes coupling an SPI port of an SPI flash memory to an MSPI port of the FPGA for the second SPI transmission.

21. The method of claim 17, further comprising connecting the SSPI port of FPGA to the MSPI port of the FPGA based on a direct memory access command.

22. The method of claim 17, further comprising electing one of a 1-bit SPI transmission and a 4-bit SPI transmission in accordance with an SPI bandwidth command.

* * * * *